US012697637B2

(12) United States Patent
Hiramatsu et al.

(10) Patent No.: US 12,697,637 B2
(45) Date of Patent: Aug. 4, 2026

(54) ULTRASONIC ATOMIZATION APPARATUS

(71) Applicant: TOSHIBA MITSUBISHI-ELECTRIC INDUSTRIAL SYSTEMS CORPORATION, Tokyo (JP)

(72) Inventors: Takahiro Hiramatsu, Tokyo (JP); Hiroyuki Orita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 127 days.

(21) Appl. No.: 18/730,337

(22) PCT Filed: Dec. 20, 2022

(86) PCT No.: PCT/JP2022/046825
§ 371 (c)(1),
(2) Date: Jul. 19, 2024

(87) PCT Pub. No.: WO2024/134753
PCT Pub. Date: Jun. 27, 2024

(65) Prior Publication Data
US 2025/0100000 A1 Mar. 27, 2025

(51) Int. Cl.
*B05B 17/06* (2006.01)
*B05B 7/04* (2006.01)
(Continued)

(52) U.S. Cl.
CPC ............ *B05B 17/0615* (2013.01); *B05B 7/04* (2013.01); *B05B 7/0416* (2013.01); *B05B 12/004* (2013.01); *B05B 12/081* (2013.01)

(58) Field of Classification Search
CPC . B05B 17/06; B05B 17/0607; B05B 17/0615; B05B 12/004; B05B 12/08; B05B 12/081; B05B 7/04; B05B 7/0416
(Continued)

(56) References Cited

U.S. PATENT DOCUMENTS 3,901,443 A * 8/1975 Mitsui ................. B05B 17/0615 239/102.2
2007/0056511 A1* 3/2007 Childers .............. A61K 9/2086 118/300
(Continued)

FOREIGN PATENT DOCUMENTS

JP 2011-136035 A 7/2011
KR 10-2344403 B1 12/2021
WO 2015/019468 A1 2/2015

OTHER PUBLICATIONS

International Search Report and Written Opinion mailed on Mar. 14, 2023, received for International Application No. PCT/JP2022/046825, filed on Dec. 20, 2022, 8 pages including English Translation.
(Continued)

*Primary Examiner* — Steven J Ganey
(74) *Attorney, Agent, or Firm* — XSENSUS LLP

(57) ABSTRACT

An ultrasonic atomization apparatus according to the present disclosure includes a non-contact mist supply pipe that is provided above an atomization container without being in contact with the atomization container including a mist output pipe and a leakproof tank that is connected to the mist output pipe without being in contact with the non-contact mist supply pipe. The leakproof tank contains a sealing proper liquid. In this case, the sealing proper liquid is contained in a liquid containing space formed between the leakproof tank and the mist output pipe.

5 Claims, 6 Drawing Sheets

(51) Int. Cl.
*B05B 12/00* (2018.01)
*B05B 12/08* (2006.01)

(58) Field of Classification Search
USPC ......... 239/102.1, 102.2, 346, 369, 423, 433, 239/434
See application file for complete search history.

(56) References Cited

U.S. PATENT DOCUMENTS

2011/0147482 A1* 6/2011 Matsuura ................. B01D 1/14 239/102.1
2022/0410199 A1* 12/2022 Hashigami .............. B05B 17/06

OTHER PUBLICATIONS

International Search Report and Written Opinion mailed on Mar. 14, 2023, received for International Application No. PCT/JP2022/046883, filed on Dec. 20, 2022, 8 pages including English Translation.
Office Action issued on Mar. 20, 2026, in corresponding German patent Application No. 112022005479.4, 7 pages.

* cited by examiner

ULTRASONIC ATOMIZATION APPARATUS

CROSS-REFERENCE TO RELATED APPLICATION

This application is a national stage application, pursuant to 35 U.S.C. § 371, of International Patent Application No. PCT/JP2022/046825, filed Dec. 20, 2022, the entire contents of which are incorporated herein by reference. This application also relates to U.S. patent application Ser. No. 18/730,314, entitled ULTRASONIC ATOMIZATION DEVICE, filed on the same day as this application.

TECHNICAL FIELD

The present disclosure relates to an ultrasonic atomization apparatus that atomizes a material solution using an ultrasonic transducer to obtain material solution mist.

BACKGROUND ART

As a deposition apparatus that sprays material solution mist obtained by atomizing (misting) a material solution onto a base material, such as a substrate, to obtain a functional thin film, an ultrasonic atomization apparatus that applies ultrasonic vibration to the material solution to generate the material solution mist has been used. In the ultrasonic atomization apparatus, the material solution mist generated in a material solution container is supplied from the material solution container to a mist jet, such as a nozzle, by a transport gas, and is sprayed from the mist jet onto the base material to form the thin film. One example of such a conventional ultrasonic atomization apparatus is an atomization apparatus disclosed in Patent Document 1.

To form a stable and uniform thin film on the base material, it is necessary to stabilize the amount of the material solution mist supplied from the ultrasonic atomization apparatus, so that it is necessary to accurately understand the amount of mist supplied from the ultrasonic atomization apparatus per unit time.

(First Supplied Mist Amount Measurement)

FIG. 5 is an illustration schematically showing an ultrasonic atomization apparatus 300 as a conventional first configuration. An XYZ Cartesian coordinate system is shown in FIG. 5. The configuration of the conventional ultrasonic atomization apparatus 300 will be described below with reference to FIG. 5.

In the ultrasonic atomization apparatus 300, a material solution container includes an atomization container 1 and a separator cup 12. A bottom surface of the material solution container is the separator cup 12. The material solution container including the atomization container 1 and the separator cup 12 as described above contains a material solution 15.

A pipe portion 1A is provided above the separator cup 12 to communicate with the top of the atomization container 1. A pipe outlet 1X of the pipe portion 1A is connected to an unillustrated mist jet, such as a nozzle, via an unillustrated mist supply pipe. Material solution mist MT generated in the material solution container of the ultrasonic atomization apparatus 300 is thus supplied to the mist jet via the pipe portion 1A and the mist supply pipe.

The ultrasonic atomization apparatus 300 further includes a water tank 10 for containing therein ultrasonic transmission water 9 as an ultrasonic transmission medium. The water tank 10 and the separator cup 12 are positioned so that a bottom surface of the separator cup 12 is submerged in the ultrasonic transmission water 9.

A plurality of ultrasonic transducers 2 are provided at a bottom surface of the water tank 10 located below the separator cup 12. Two ultrasonic transducers 2 are illustrated in FIG. 5. The plurality of ultrasonic transducers 2 include respective ultrasonic diaphragms 2T and perform ultrasonic vibration operation to generate, from the ultrasonic diaphragms 2T, ultrasonic waves W2 having sizes matching planar shapes of the ultrasonic diaphragms 2T.

A gas supply pipe 4 as a transport gas supply pipe is provided to an upper side surface of the atomization container 1, and a transport gas G4 is supplied from the gas supply pipe 4 to an internal space 1H of the atomization container 1. An unillustrated gas control device is attached to the gas supply pipe 4, and a flow rate of the transport gas G4 supplied to the atomization container 1 is controlled by the gas control device.

A gas supply pipe 3 as a diluent gas supply pipe is provided to a side surface of the pipe portion 1A, and a diluent gas G3 is supplied from the gas supply pipe 3. An unillustrated gas control device is attached to the gas supply pipe 3, and a flow rate of the diluent gas G3 supplied into the pipe portion 1A is controlled by the gas control device.

As described above, the material solution container including the atomization container 1 and the separator cup 12 contains the material solution 15. The bottom surface of the material solution container is the separator cup 12.

A material tank 35 is further provided independently of the material solution container including the atomization container 1 and the separator cup 12. The material tank 35 contains therein the material solution 15 to be supplied to the material solution container. A material solution supply pipe 31 is provided between the material solution container and the material tank 35. The material solution 15 can be supplied from the material tank 35 to the material solution container via the material solution supply pipe 31.

A material solution supply mechanism 8 including a suction pump 32 and a flowmeter 33 is provided along the material solution supply pipe 31.

The ultrasonic atomization apparatus 300 as the conventional first configuration further includes a scale 51 that measures the weight of the material tank 35 and the material solution 15 in the material tank 35 as a measurement target. The scale 51 as a weight measuring instrument can measure the weight of the measurement target as a measured weight.

The material solution supply mechanism 8 and the material solution supply pipe 31 are excluded from the measurement target of the scale 51. For example, the suction pump 32 and the flowmeter 33 are installed on another mount not to affect weight measurement performed by the scale 51. However, a portion of the material solution supply pipe 31 from the flowmeter 33 to the material tank 35 (hereinafter abbreviated to a "supply pipe measurement target portion") is included in the measurement target of the scale 51.

The weight of the above-mentioned supply pipe measurement target portion, however, has a constant value, so that a change in weight of the measurement target can accurately be measured even though the supply pipe measurement target portion is included in the measurement target. The ultrasonic atomization apparatus 300 thus has no particular problem as the amount of the material solution 15 supplied to the material solution container can be estimated from the change in weight of the measurement target measured by the scale 51.

The ultrasonic atomization apparatus 300 can obtain the amount of the material solution 15 supplied from the material tank 35 to the material solution container based on the measured weight measured by the scale 51.

That is to say, the amount of the material solution 15 supplied from the material tank 35 to the material solution container can be obtained based on reduction in weight ΔP12 (=P1−P2), where P1 is the measured weight of the measurement target at time t1, P2 is the measured weight of the measurement target at time t2 after the time t1.

The amount of the supplied material solution 15 has a value indirectly indicating the amount of the supplied material solution mist MT. This is because it can be inferred that the amount of the supplied material solution 15 matches the amount of the material solution 15 consumed in the atomization container 1, and the material solution mist MT in an amount matching the amount of the consumed material solution 15 is generated.

The ultrasonic atomization apparatus 300 can thus obtain the amount of the supplied material solution mist MT from the amount of the supplied material solution 15 obtained based on the measured weight of the measurement target measured by the scale 51.

In the conventional ultrasonic atomization apparatus 300 having such a configuration, when the plurality of ultrasonic transducers 2 including the respective ultrasonic diaphragms 2T perform the ultrasonic vibration operation to apply ultrasonic vibration, a vibration energy of the ultrasonic waves W2 from the plurality of ultrasonic transducers 2 is transmitted to the material solution 15 in the material solution container via the ultrasonic transmission water 9 and the separator cup 12.

Then, as illustrated in FIG. 5, liquid columns 6 rise from a liquid level 15A, the material solution 15 transitions to drops and mist, and the material solution mist MT can be obtained in the internal space 1H of the atomization container 1. As described above, the ultrasonic transducers 2 perform the ultrasonic vibration operation to apply the ultrasonic waves W2 to atomize the material solution 15 to thereby generate the material solution mist MT.

The material solution mist MT generated in the atomization container 1 during performance of the ultrasonic vibration operation flows in the pipe portion 1A along a mist output direction DM by the transport gas G4 supplied from the gas supply pipe 4 and then is supplied from the pipe outlet 1X of the pipe portion 1A to the mist supply pipe and the mist jet.

A gas system connected to the conventional ultrasonic atomization apparatus 300 includes two gas systems for the transport gas G4 and the diluent gas G3. The diluent gas G3 is a gas to maintain the total amount of gas of the material solution mist MT ejected from the mist jet, such as the nozzle, constant.

The material solution mist MT generated in the internal space 1H of the atomization container 1 by the ultrasonic vibration operation of the plurality of ultrasonic transducers 2 is supplied from the pipe outlet 1X of the pipe portion 1A outside the atomization container 1 to the mist supply pipe and the mist jet, which are not illustrated, by the diluent gas G3 and the transport gas G4. In a case where the amount of the material solution mist MT generated in the internal space 1H of the atomization container 1 is maintained constant, the amount of the material solution mist MT supplied from the atomization container 1 to the mist jet can be increased and reduced by a transport gas flow rate LC of the transport gas G4 supplied from the gas supply pipe 4.

On the other hand, in formation of the thin film using the material solution mist MT, not only a stable amount of mist but also a constant total gas flow rate LT of the material solution mist MT output from the mist jet is necessary. This is because, when the total gas flow rate LT is maintained constant, a spray speed of the material solution mist MT ejected from the mist jet can be maintained constant. An opening of the nozzle as the mist jet is slit-shaped, for example.

As described above, the material solution mist MT is supplied to the outside of the atomization container 1 by the transport gas G4. With the transport (delivery) of the material solution mist MT to the outside, the material solution 15 in the material solution container is reduced. It is necessary to maintain the amount of the material solution 15 in the material solution container constant to stabilize the amount of generated mist. This is because the amount of the generated material solution mist MT varies depending on the liquid level 15A of the material solution 15 from the plurality of ultrasonic transducers 2.

Thus, the liquid level 15A of the material solution 15 in the material solution container is detected using a liquid level detector 19, the amount of the reduced material solution 15 is obtained based on the liquid level 15A, and the material solution 15 is supplied from the material tank 35 according to the amount of the reduced material solution 15 as appropriate. That is to say, the material solution 15 is supplied from the material tank 35 via the material solution supply pipe 31 to compensate for the amount of the reduced material solution 15 in the material solution container.

Due to the supply of the material solution 15 from the material tank 35, the liquid level 15A of the material solution 15 in the material solution container is maintained constant, so that the amount of the material solution 15 supplied from the material tank 35 eventually becomes equal to the amount of the reduced material solution 15 in the material solution container. The ultrasonic atomization apparatus 300 thus estimates the amount of the generated material solution mist MT based on the amount of the material solution 15 supplied from the material tank 35.

As described above, the ultrasonic atomization apparatus 300 as the conventional first configuration measures the amount of the generated material solution mist MT, that is, the amount of mist supplied to the mist jet based on the amount of the material solution 15 supplied from the material tank 35 to stabilize a process of generating the material solution mist MT.

On the other hand, in a case where the transport gas flow rate LC is increased and reduced to control the amount of the supplied material solution mist MT, the total gas flow rate LT of the material solution mist MT is increased and reduced accordingly.

It is thus necessary to supply the diluent gas G3 in a different system from the transport gas G4 from the gas supply pipe 3 to the pipe portion 1A near the atomization container 1 as illustrated in FIG. 6 to maintain the total gas flow rate LT constant. The relationship among the transport gas flow rate LC, a diluent gas flow rate LD, and the total gas flow rate LT is herein determined by an equation (1) below, where LD is the flow rate of the diluent gas G3.

$$LT=LC+LD \quad (1)$$

Each of the transport gas flow rate LC, the diluent gas flow rate LD, and the total gas flow rate LT indicates the volume amount per unit time and is represented in units of "1 (liters)/min", for example.

For example, in a case where the transport gas flow rate LC is reduced by ΔLC to reduce the amount of the supplied material solution mist MT, the total gas flow rate LT can be maintained constant by increasing the diluent gas flow rate LD by ΔLC.

As described above, the conventional ultrasonic atomization apparatus 300 can maintain the total gas flow rate LT of the material solution mist MT constant regardless of a change in transport gas flow rate LC by adding a diluent gas system for the diluent gas G3.

(Second Supplied Mist Amount Measurement)

FIG. 6 is an illustration schematically showing an ultrasonic atomization apparatus 301 as a conventional second configuration. The XYZ Cartesian coordinate system is shown in FIG. 6. The configuration of the ultrasonic atomization apparatus 301 as the conventional second configuration will be described below with reference to FIG. 6. Components of the ultrasonic atomization apparatus 301 similar to those of the ultrasonic atomization apparatus 300 illustrated in FIG. 5 bear the same reference signs as those of the similar components, and description thereof is omitted as appropriate.

Although not illustrated in FIG. 6, the ultrasonic atomization apparatus 301 includes the material solution supply pipe 31, the material solution supply mechanism 8, and the material tank 35 for containing the material solution 15 as with the ultrasonic atomization apparatus 300. The ultrasonic atomization apparatus 301, however, does not include the scale 51 that measures the weight of the material tank 35 and the material solution 15 as the measurement target.

The ultrasonic atomization apparatus 301 as the conventional second configuration includes a scale 52 that measures the weight of the material solution container (the atomization container 1+the separator cup 12), the water tank 10, the plurality of ultrasonic transducers 2, the material solution 15 in the atomization container 1, and the ultrasonic transmission water 9 in the water tank 10 as the measurement target. The scale 52 as a weight measuring instrument measures the weight of the measurement target as a measured weight.

The gas supply pipe 3, the gas supply pipe 4, and the material solution supply pipe 31 are excluded from the measurement target of the scale 52. For example, a plurality of support points are provided to the gas supply pipe 3, the gas supply pipe 4, and the material solution supply pipe 31, and the gas supply pipe 3, the gas supply pipe 4, and the material solution supply pipe 31 are suspended at the plurality of support points to be stably supported. As a result, the gas supply pipe 3, the gas supply pipe 4, and the material solution supply pipe 31 can be excluded from the measurement target of the scale 52.

The scale 52 as the weight measuring instrument supports the water tank 10 from the bottom surface of the water tank 10 using a support member 53 without being in contact with the plurality of ultrasonic transducers 2 and measures the weight of the measurement target including the material solution container (the atomization container 1+the separator cup 12), the plurality of ultrasonic transducers 2, the water tank 10, the material solution 15, and the ultrasonic transmission water 9.

The ultrasonic atomization apparatus 301 can obtain the amount of the material solution 15 consumed in the material solution container based on the measured weight measured by the scale 52.

That is to say, the amount of the material solution 15 consumed in the material solution container can be obtained from the reduction in weight ΔP12 (=P1−P2), where P1 is the measured weight of the measurement target at the time t1, P2 is the measured weight of the measurement target at the time t2 after the time t1. In this case, it can be inferred that the material solution mist MT in an amount matching the amount of the consumed material solution 15 is generated.

The ultrasonic atomization apparatus 301 as the conventional second configuration can thus obtain the amount of the supplied material solution mist MT from the amount of the consumed material solution 15 measured based on the measured weight of the measurement target measured by the scale 52.

PRIOR ART DOCUMENTS

Patent Document

Patent Document 1: WO 2015/019468

SUMMARY

Problem to be Solved by the Invention

A first supplied mist amount measurement method for use in the ultrasonic atomization apparatus 300 as the conventional first configuration illustrated in FIG. 5 utilizes material solution supply characteristics of the material solution 15 in the material solution container being reduced as a result of supply of the material solution mist MT generated in the internal space 1H of the atomization container 1 to the mist jet, and the material solution 15 being supplied from the material tank 35 to the material solution container at a timing of detection of the reduction.

The amount of the material solution 15 supplied from the material tank 35 for use in the ultrasonic atomization apparatus 300 is thus not information at the moment when the material solution mist MT is generated and supplied to the outside but delayed information. The amount of the supplied material solution 15 for use in the ultrasonic atomization apparatus 300 thus has a first problem of poor responsiveness as information to control the amount of supplied mist constant.

On the other hand, a second supplied mist amount measurement method for use in the ultrasonic atomization apparatus 301 as the conventional second configuration illustrated in FIG. 6 is a method of measuring the weight of the measurement target including the material solution 15 in the material solution container and estimating the amount of supplied mist from the change in weight. The second supplied mist amount measurement method thus solves the above-mentioned first problem.

However, the mist supply pipe to supply the mist to the mist jet, such as the nozzle, is connected to the pipe outlet 1X of the pipe portion 1A, and a rigid metal pipe and a fluororesin pipe are often used as the mist supply pipe as the mist supply pipe is required to have chemical resistance and mechanical strength. At least portion of the mist supply pipe is included in the measurement target of the scale 52.

The mist supply pipe thus produces a weight distribution effect of the measured weight measured by the scale 52, and thus the conventional ultrasonic atomization apparatus 301 has a second problem in that the weight of the measurement target cannot accurately be measured.

The weight distribution effect refers to characteristics of force to direct the atomization container 1 upward in FIG. 6 being applied as force to pull up the atomization container 1 when the mist supply pipe is attached to the pipe portion 1A so that the weight of the measurement target cannot accurately be measured.

As described above, the conventional ultrasonic atomization apparatus including the ultrasonic atomization apparatus 300 and the ultrasonic atomization apparatus 301 has a problem in that the amount of the supplied material solution mist MT cannot responsively and accurately be obtained.

It is an object of the present disclosure to provide an ultrasonic atomization apparatus capable of solving a problem as described above and responsively and accurately obtaining the amount of supplied material solution mist.

Means to Solve the Problem

An ultrasonic atomization apparatus according to the present disclosure is an ultrasonic atomization apparatus including: a material solution container that has an internal space for containing a material solution and includes a mist output pipe at a top surface thereof; an ultrasonic transducer that is provided below the material solution container; a non-contact mist supply pipe that is provided above the material solution container without being in contact with the material solution container including the mist output pipe; a leakproof tank that is provided to be connected to the mist output pipe without being in contact with the non-contact mist supply pipe; and a weight measuring instrument that supports the material solution container from below and measures the weight of a measurement target including the material solution container, the ultrasonic transducer, the leakproof tank, and the material solution, wherein the material solution is misted by ultrasonic vibration operation of the ultrasonic transducer to generate material solution mist in the internal space, the non-contact mist supply pipe includes an overlapping pipe portion and a non-overlapping pipe portion other than the overlapping pipe portion, the overlapping pipe portion having a pipe overlapping region in which the overlapping pipe portion and an upper region of the mist output pipe overlap along a mist output direction, a pipe overlapping space being formed between the overlapping pipe portion and the upper region, a liquid containing space is formed between the leakproof tank and the mist output pipe, the liquid containing space containing a sealing liquid therein, the sealing liquid being present in the pipe overlapping space, the measurement target further including the sealing liquid, and the material solution mist flows in the mist output pipe and the non-contact mist supply pipe along the mist output direction and is output from the non-contact mist supply pipe.

Effects of the Invention

The non-contact mist supply pipe of the ultrasonic atomization apparatus according to the present disclosure does not have a contacting relationship with the material solution container including the mist output pipe and thus can relatively easily be excluded from the measurement target of the weight measuring instrument.

On the other hand, the material solution in the material solution container is included in the measurement target of the weight measuring instrument, and the weight of the measurement target excluding the material solution has a constant value. The amount of consumed material solution can thus be obtained from a change in weight of the measurement target with accuracy. In addition, there is no delay between the amount of the consumed material solution and the amount of the generated material solution mist.

As a result, the ultrasonic atomization apparatus according to the present disclosure can obtain the amount of the consumed material solution from the change in weight of the measurement target and responsively and accurately obtain the amount of the supplied material solution mist based on the amount of the consumed material solution during performance of the ultrasonic vibration operation.

In addition, the sealing liquid is present in the pipe overlapping space between the non-contact mist supply pipe and the leakproof tank, and a flow path of the material solution mist in the pipe overlapping space is sealed by the sealing liquid.

The ultrasonic atomization apparatus according to the present disclosure can thus suppress a mist leak phenomenon of leak of the material solution mist to the outside of the non-contact mist supply pipe via the pipe overlapping space.

The objects, features, aspects and advantages of the present disclosure will become more apparent from the following detailed description when taken in conjunction with the accompanying drawings.

DESCRIPTION OF EMBODIMENTS

Embodiment 1

Figure 1:
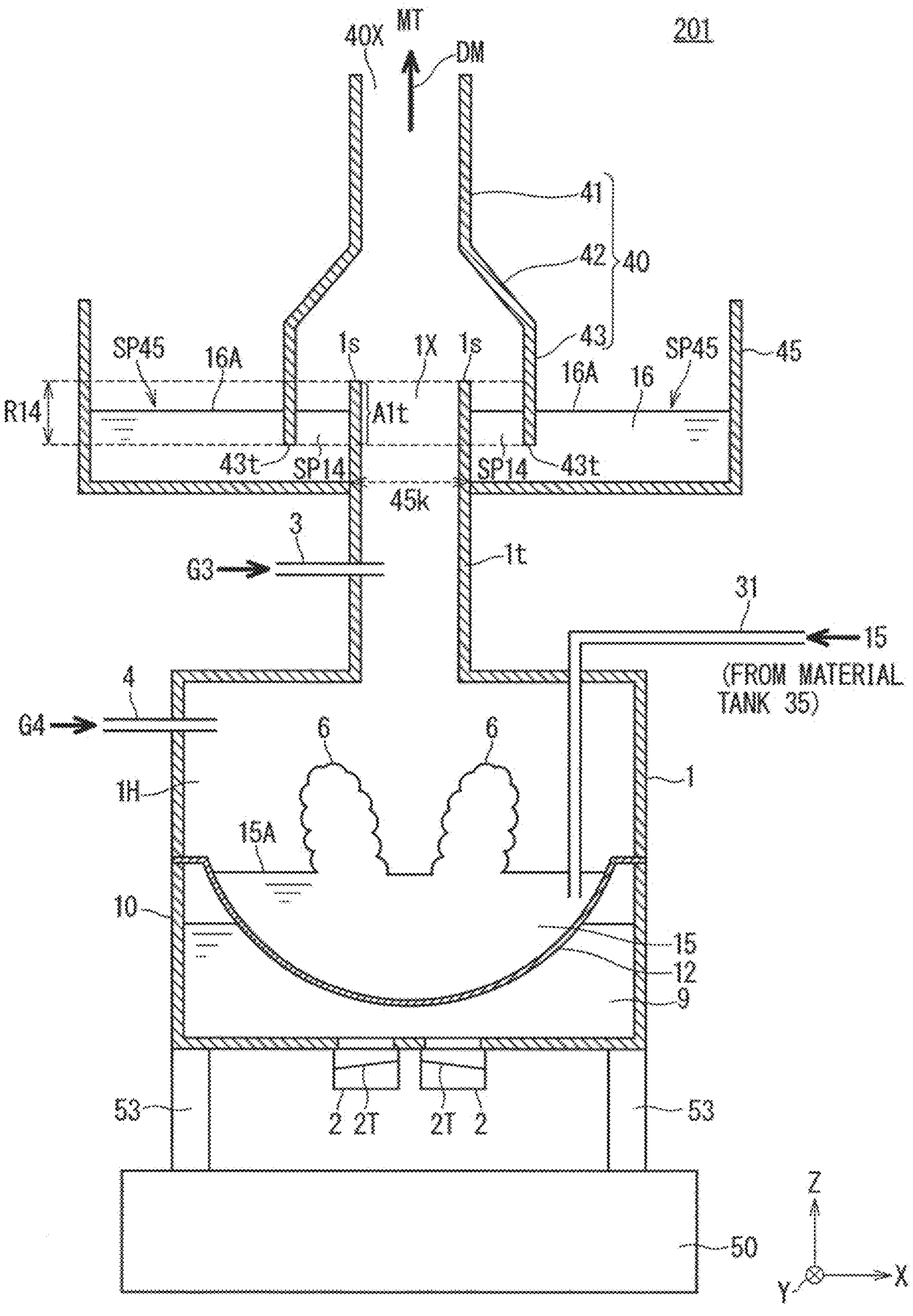
FIG. 1 is an illustration schematically showing a configuration of an ultrasonic atomization apparatus in Embodiment 1 of the present disclosure.

FIG. 1 is an illustration schematically showing a configuration of an ultrasonic atomization apparatus 201 in Embodiment 1 of the present disclosure. An XYZ Cartesian coordinate system is shown in FIG. 1. The configuration of the ultrasonic atomization apparatus 201 in Embodiment 1 will be described below with reference to FIG. 1.

In the ultrasonic atomization apparatus 201, a material solution container includes an atomization container 1 and a separator cup 12. A bottom surface of the material solution container is the separator cup 12. The material solution container including the atomization container 1 and the separator cup 12 as described above has an internal space 1H for containing a material solution 15.

A mist output pipe 1*t* is provided above the separator cup 12 to communicate with a top surface of the atomization container 1. That is to say, the atomization container 1 includes the mist output pipe 1*t* at the top surface thereof.

The ultrasonic atomization apparatus 201 further includes a water tank 10 as a transmission medium tank for containing ultrasonic transmission water 9 as an ultrasonic transmission medium therein. The water tank 10 and the separator cup 12 are positioned so that a bottom surface of the separator cup 12 is submerged in the ultrasonic transmission water 9. An end of the separator cup 12 is sandwiched between the atomization container 1 and the water tank 10 to integrally configure the atomization container 1, the water tank 10, and the separator cup 12.

A plurality of ultrasonic transducers 2 are provided at a bottom surface of the water tank 10 located below the separator cup 12. Two ultrasonic transducers 2 are illustrated in FIG. 1. The plurality of ultrasonic transducers 2 include respective ultrasonic diaphragms 2T and perform ultrasonic vibration operation to generate, from the ultrasonic diaphragms 2T, ultrasonic waves having sizes matching planar shapes of the ultrasonic diaphragms 2T.

A gas supply pipe 4 is provided to an upper side surface of the atomization container 1, and a transport gas G4 is supplied from the gas supply pipe 4 as a transport gas supply pipe to the internal space 1H in the atomization container 1. An unillustrated gas control device is attached to the gas supply pipe 4, and a transport gas flow rate LC as a flow rate of the transport gas G4 supplied to the atomization container 1 is controlled by the gas control device.

A gas supply pipe 3 is provided to a side surface of the mist output pipe 1*t*, and a diluent gas G3 is supplied from the gas supply pipe 3 as a diluent gas supply pipe. An unillustrated gas control device is attached to the gas supply pipe 3, and a diluent gas flow rate LD1 as a flow rate of the diluent gas G3 supplied into the mist output pipe 1*t* is controlled by the gas control device.

A non-contact mist supply pipe 40 is provided above the atomization container 1 without being in contact with the atomization container 1 including the mist output pipe 1*t*. The non-contact mist supply pipe 40 includes a downstream pipe portion 41, a tapered pipe portion 42, and a connection pipe portion 43.

The connection pipe portion 43 is disposed to surround an upper region Alt of the mist output pipe 1*t*. The connection pipe portion 43 thus has a pipe overlapping region R14 in which the connection pipe portion 43 and the upper region Alt of the mist output pipe 1*t* overlap along a mist output direction DM, and a pipe overlapping space SP14 is formed between the connection pipe portion 43 and the upper region Alt. As described above, the connection pipe portion 43 is an overlapping pipe portion overlapping the upper region Alt.

On the other hand, the tapered pipe portion 42 and the downstream pipe portion 41 do not have the pipe overlapping region R14 in which the tapered pipe portion 42 and the downstream pipe portion 41 overlap the upper region Alt along the mist output direction DM. That is to say, the tapered pipe portion 42 and the downstream pipe portion 41 are each a non-overlapping pipe portion other than the overlapping pipe portion.

The connection pipe portion 43 is a pipe portion having a constant inside diameter and extending in a Z direction in FIG. 1, the tapered pipe portion 42 is a pipe portion having an inside diameter reduced in a +Z direction in FIG. 1, and the downstream pipe portion 41 is a pipe portion having a constant inside diameter and extending in the Z direction in FIG. 1. An inside diameter of a top end of the tapered pipe portion 42 matches the inside diameter of the downstream pipe portion 41, and an inside diameter of a bottom end of the tapered pipe portion 42 matches the inside diameter of the connection pipe portion 43.

As described above, the non-contact mist supply pipe 40 includes the connection pipe portion 43, the tapered pipe portion 42, and the downstream pipe portion 41 provided contiguously along the +Z direction. The downstream pipe portion 41 is located above the mist output pipe 1*t* and is an extension in the +Z direction of the mist output pipe 1*t*.

The connection pipe portion 43 has a sufficiently greater inside diameter than the mist output pipe 1*t*, so that the pipe overlapping space SP14 is formed between the connection pipe portion 43 and the upper region Alt of the mist output pipe 1*t* without the connection pipe portion 43 being in contact with the upper region Alt. On the other hand, the pipe overlapping space SP14 is not formed between the mist output pipe 1*t* and each of the tapered pipe portion 42 and the downstream pipe portion 41 each being the non-overlapping pipe portion.

The ultrasonic atomization apparatus 201 further includes a leakproof tank 45 that is provided to be connected to the mist output pipe 1*t* without being in contact with the non-contact mist supply pipe 40. The leakproof tank 45 is a tank for containing a sealing liquid. The leakproof tank 45 has an opening 45*k* at the center thereof and is connected to the mist output pipe 1*t* so that the mist output pipe 1*t* extends through the opening 45*k*. A bottom surface of the leakproof tank 45 is located below a leading end 43*t* of the connection pipe portion 43.

A liquid containing space SP45 is thus formed between the leakproof tank 45 and the mist output pipe 1*t*, and a sealing proper liquid 16 as the sealing liquid is contained in the liquid containing space SP45.

The sealing proper liquid 16 is contained in the liquid containing space SP45 so that a liquid level 16A of the sealing proper liquid 16 is higher than the leading end 43*t* of the connection pipe portion 43 and is lower than an uppermost end 1*s* of the mist output pipe 1*t*.

The sealing proper liquid 16 is thus present in the pipe overlapping space SP14. That is to say, the non-contact mist supply pipe 40 is positioned without being in contact with the leakproof tank 45 itself excluding the sealing proper liquid 16 so that the leading end 43*t* as a lower end of the connection pipe portion 43 is submerged in the sealing proper liquid 16.

A region below the pipe overlapping space SP14 is thus a space closed by the sealing proper liquid 16. That is to say, a flow path of the material solution mist MT in the pipe overlapping space SP14 is sealed by the sealing proper liquid 16.

The sealing proper liquid 16 is a liquid having a higher specific gravity and a higher viscosity than water and being suitable for sealing of a space and is silicon-based oil, acetic acid, and the like, for example.

Figure 2:
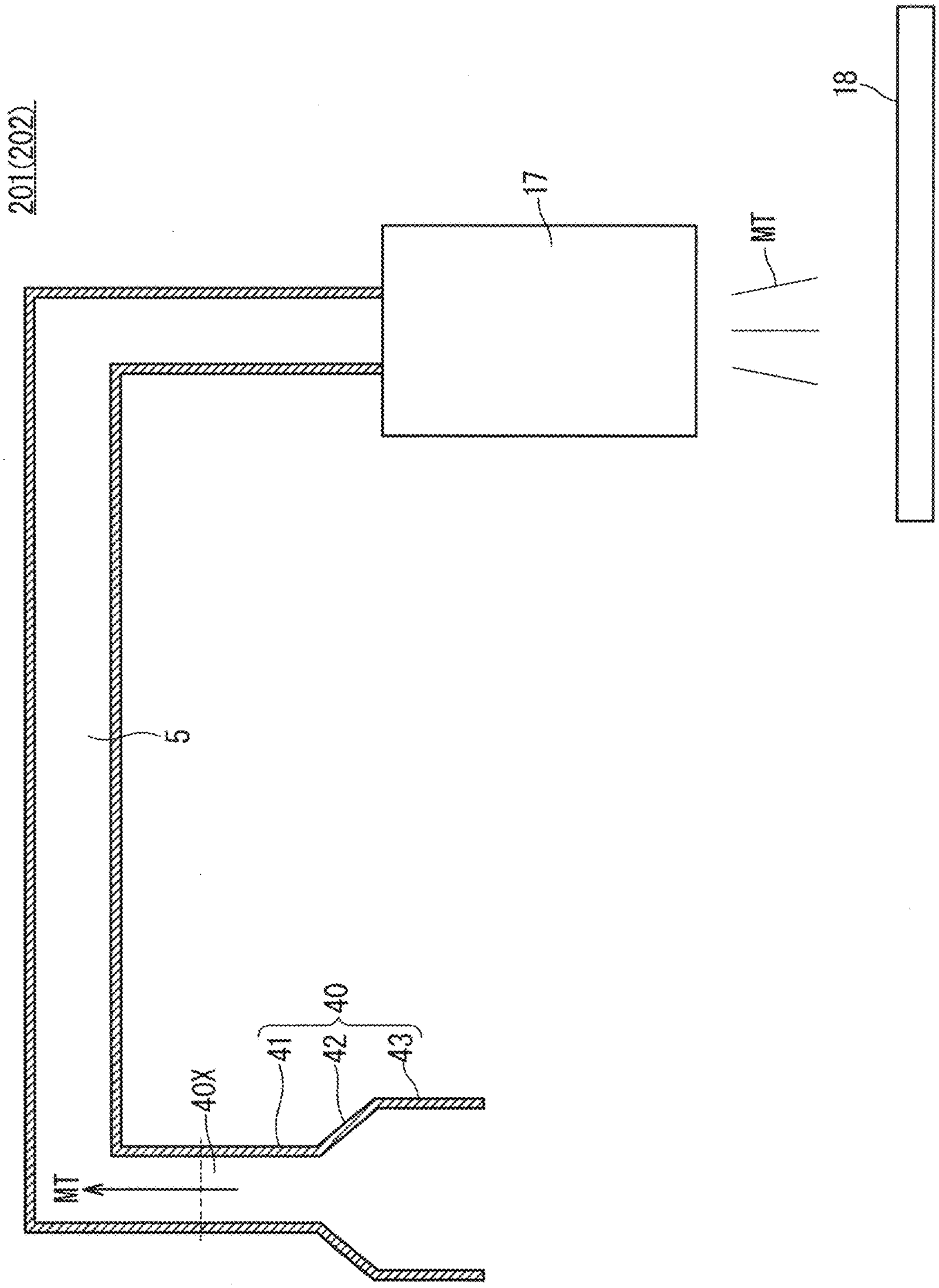
FIG. 2 is an illustration schematically showing a mist supply system including a non-contact mist supply pipe illustrated in FIG. 1.

FIG. 2 is an illustration schematically showing a mist supply system including the non-contact mist supply pipe 40. As illustrated in FIG. 2, a pipe outlet 40X of the non-contact mist supply pipe 40 and one end of a mist supply pipe 5 are connected. A nozzle 17 as the mist jet is connected to the other end of the mist supply pipe 5.

A substrate 18 as a base material is disposed below the nozzle 17. The substrate 18 is placed on an unillustrated mount, for example. The material solution mist MT supplied to the nozzle 17 as the mist jet is ejected from an unillustrated opening in a bottom surface of the nozzle 17 to a surface of the substrate 18 to form a thin film on the surface of the substrate 18 being heated. The opening of the nozzle 17 is slit-shaped, for example.

Figure 5:
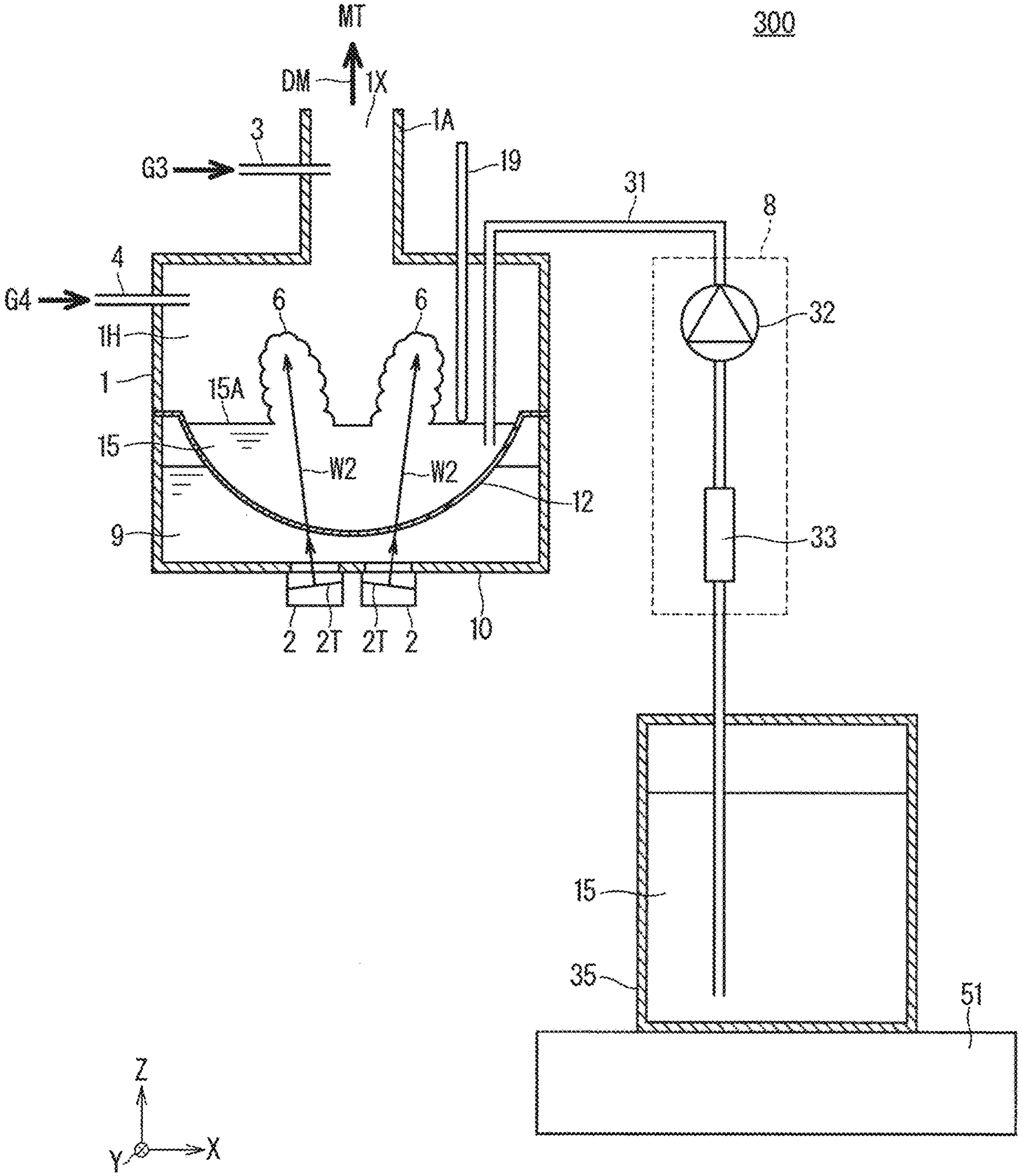
FIG. 5 is an illustration schematically showing an ultrasonic atomization apparatus as a conventional first example configuration.

Although not illustrated in FIG. 1, the ultrasonic atomization apparatus 201 in Embodiment 1 includes the material tank 35 provided independently of the material solution container including the atomization container 1 and the separator cup 12 similarly to the ultrasonic atomization apparatus 300 illustrated in FIG. 5. As illustrated in FIG. 5, the material tank 35 contains therein the material solution 15 to be supplied to the material solution container. The ultrasonic atomization apparatus 201 also includes the material solution supply pipe 31 and the material solution supply mechanism 8 similarly to the ultrasonic atomization apparatus 300 illustrated in FIG. 5. The scale 51 that measures the weight of the measurement target including the material tank 35, however, is not provided.

The ultrasonic atomization apparatus 201 in Embodiment 1 includes a scale 50 that measures the weight of the material solution container (the atomization container 1+the separator cup 12), the water tank 10 as the transmission medium tank, the leakproof tank 45, the plurality of ultrasonic transducers 2, the material solution 15 in the material solution container, the sealing proper liquid 16 in the liquid containing space SP45, and the ultrasonic transmission water 9 in the water tank 10 as the measurement target. The scale 50 as a weight measuring instrument measures the weight of the measurement target as a measured weight.

In the ultrasonic atomization apparatus 201 in Embodiment 1, for example, a plurality of support points are provided to the gas supply pipe 3, the gas supply pipe 4, and the material solution supply pipe 31, and the gas supply pipe 3, the gas supply pipe 4, and the material solution supply pipe 31 are suspended at the plurality of support points to be stably supported. As a result, the gas supply pipe 3, the gas supply pipe 4, and the material solution supply pipe 31 can be excluded from the measurement target of the scale 50.

The scale 50 as the weight measuring instrument supports the water tank 10 from the bottom surface of the water tank 10 using the support member 53 without being in contact with the plurality of ultrasonic transducers 2. The scale 50 measures the weight of the measurement target including the material solution container (the atomization container 1+the separator cup 12), the plurality of ultrasonic transducers 2, the water tank 10 as the transmission medium tank, the leakproof tank 45, the material solution 15, the ultrasonic transmission water 9, and the sealing proper liquid 16. As described above, the scale 50 supports the material solution container from below and measures the weight of the measurement target.

In the ultrasonic atomization apparatus 201, the non-contact mist supply pipe 40 and the mist supply system illustrated in FIG. 2 do not have a contacting relationship with the atomization container 1 including the mist output pipe 1*t* and thus can surely be excluded from the measurement target of the scale 50.

The ultrasonic atomization apparatus 201 in Embodiment 1 can obtain the amount of the material solution 15 consumed in the material solution container based on the measured weight measured by the scale 50.

That is to say, the ultrasonic atomization apparatus 201 in Embodiment 1 can obtain the amount of the material solution 15 consumed in the material solution container from the reduction in weight ΔP12 (=P1−P2), where P1 is the measured weight of the measurement target at the time t1, P2 is the measured weight of the measurement target at the time t2 after the time t1.

Figure 6:
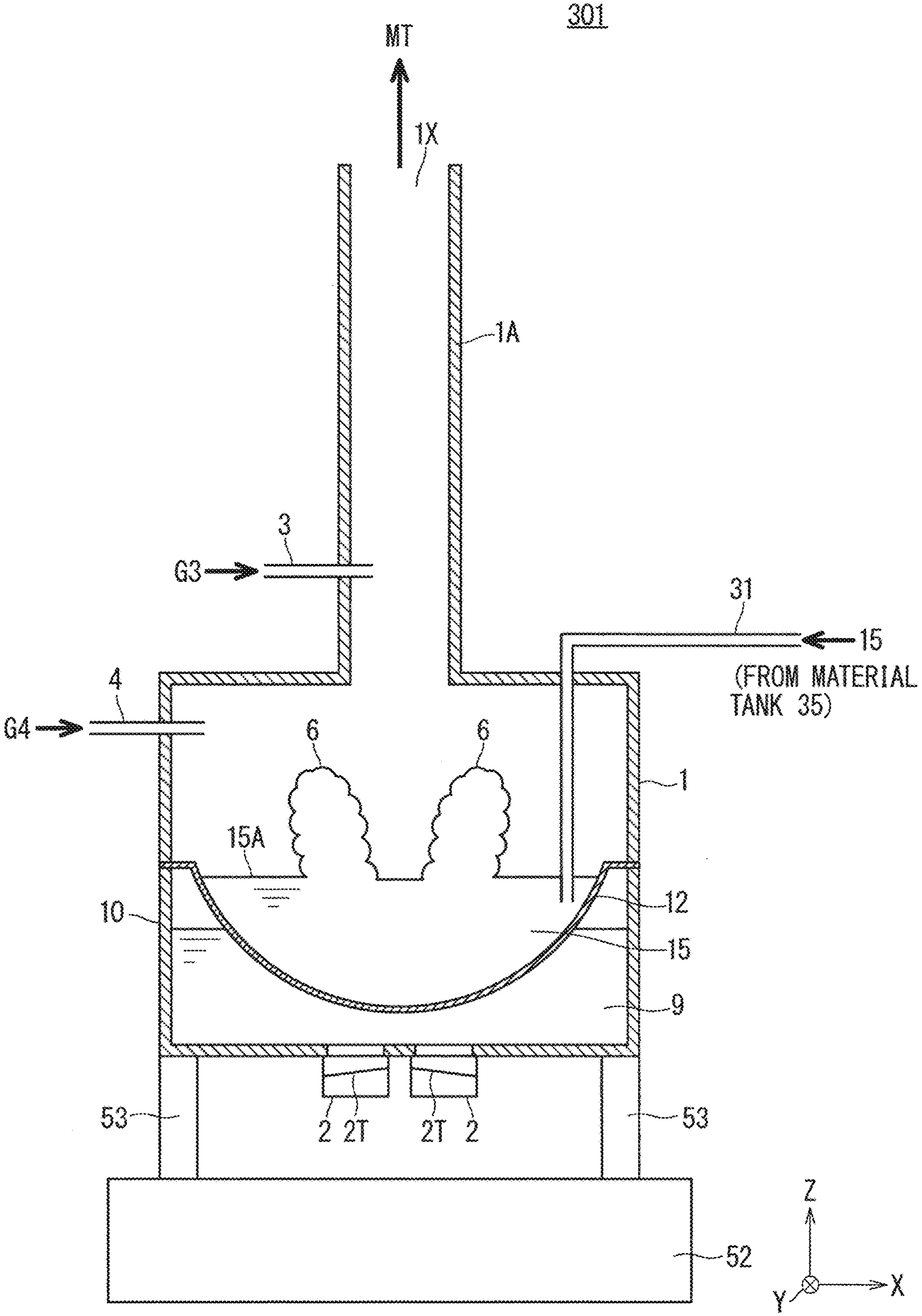
FIG. 6 is an illustration schematically showing an ultrasonic atomization apparatus as a conventional second example configuration.

The ultrasonic atomization apparatus 201 in Embodiment 1 can thus obtain the amount of the supplied material solution mist MT from the amount of the consumed material solution 15 obtained based on the change in measured weight of the measurement target measured by the scale 50 as with the ultrasonic atomization apparatus 301 illustrated in FIG. 6.

In the ultrasonic atomization apparatus 201 in Embodiment 1 having such a configuration, when the plurality of ultrasonic transducers 2 including the respective ultrasonic diaphragms 2T perform the ultrasonic vibration operation to apply ultrasonic vibration, a vibration energy of ultrasonic waves from the plurality of ultrasonic transducers 2 is transmitted to the material solution 15 in the material solution container via the ultrasonic transmission water 9 and the separator cup 12.

Then, as illustrated in FIG. 1, liquid columns 6 rise from a liquid level 15A, the material solution 15 transitions to drops and mist, and the material solution mist MT can be obtained in the internal space 1H of the atomization container 1. As described above, the ultrasonic transducers 2 perform the ultrasonic vibration operation to apply the ultrasonic waves to atomize the material solution 15 to thereby generate the material solution mist MT.

The material solution mist MT generated in the internal space 1H of the atomization container 1 during performance of the ultrasonic vibration operation flows in the mist output pipe 1*t* along the mist output direction DM by the transport gas G4 and the diluent gas G3. Even after being output from the pipe outlet 1X of the mist output pipe 1*t*, the material solution mist MT flows in the non-contact mist supply pipe 40 along the mist output direction DM by the transport gas G4 and the diluent gas G3. The material solution mist MT is then supplied from the pipe outlet 40X of the non-contact mist supply pipe 40 to the mist supply system including the mist supply pipe 5 and the nozzle 17.

A gas system connected to the ultrasonic atomization apparatus 201 in Embodiment 1 includes two gas systems for the transport gas G4 and the diluent gas G3. The diluent gas G3 is a gas to maintain the total amount of gas of the material solution mist MT ejected from the mist jet, such as the nozzle 17, constant.

The material solution mist MT generated in the internal space 1H of the atomization container 1 by the ultrasonic vibration operation flows through the mist output pipe 1*t*, the non-contact mist supply pipe 40, and the mist supply pipe 5 outside the atomization container 1 by the diluent gas G3 and the transport gas G4 and is supplied to the nozzle 17 (mist jet). In this case, the material solution mist MT flows in the mist output pipe 1*t* and the non-contact mist supply pipe 40 along the mist output direction DM (+Z direction).

In a case where the amount of the material solution mist MT generated in the internal space 1H of the atomization container 1 is maintained constant, the amount of the material solution mist MT supplied from the atomization container 1 to the mist jet can be increased and reduced by the transport gas flow rate LC of the transport gas G4.

On the other hand, in formation of the thin film using the material solution mist MT, not only a stable amount of mist but also a constant total gas flow rate LT of the material solution mist MT supplied to the mist jet is necessary as described above. When the total gas flow rate LT is maintained constant, a spray speed of the material solution mist MT ejected from the mist jet can be maintained constant.

The material solution mist MT generated in the internal space 1H by the ultrasonic vibration operation of the plurality of ultrasonic transducers 2 is supplied to the outside of the atomization container 1 by the transport gas G4 and the diluent gas G3. With the transport of the material solution mist MT to the outside, the amount of the material solution 15 in the material solution container is reduced. As described above, it is necessary to maintain the amount of the material solution 15 in the material solution container constant to stabilize the amount of the generated material solution mist MT.

In a case where the transport gas flow rate LC of the transport gas G4 is increased and reduced to control the amount of the supplied material solution mist MT, the total gas flow rate LT of the material solution mist MT is increased and reduced accordingly.

The gas supply pipe 3 is thus provided to the mist output pipe 1*t* near the atomization container 1 as illustrated in FIG. 1, and the diluent gas G3 in a different system from the transport gas G4 is supplied from the gas supply pipe 3 as the diluent gas supply pipe to maintain the total gas flow rate LT constant.

As described above, the relationship among the transport gas flow rate LC of the transport gas G4, the diluent gas flow rate LD of the diluent gas G3, and the total gas flow rate LT of the material solution mist MT satisfies the above-mentioned equation (1).

As described above, the ultrasonic atomization apparatus 201 in Embodiment 1 can maintain the total gas flow rate LT constant using the diluent gas G3 regardless of the change in transport gas flow rate LC.

The non-contact mist supply pipe 40 of the ultrasonic atomization apparatus 201 in Embodiment 1 does not have the contacting relationship with the atomization container 1 including the mist output pipe 1*t* and the leakproof tank 45 and thus can relatively easily be excluded from the measurement target of the scale 50 as the weight measuring instrument.

On the other hand, the material solution 15 in the material solution container is included in the measurement target of the scale 50 as the weight measuring instrument, and the weight of the measurement target excluding the material solution 15 has a constant value.

Specifically, the total weight of the atomization container 1, the separator cup 12, the water tank 10 as the transmission medium tank, the leakproof tank 45, the plurality of ultrasonic transducers 2, the ultrasonic transmission water 9, and the sealing proper liquid 16 has a constant value. The weight of the ultrasonic transmission water 9 is not increased and reduced by the ultrasonic vibration operation.

The ultrasonic atomization apparatus 201 in Embodiment 1 can thus obtain the amount of the material solution 15 consumed in the material solution container from the change in weight of the measurement target with accuracy. In this case, there is no delay between the amount of the consumed material solution 15 and the amount of the generated material solution mist MT.

As a result, the ultrasonic atomization apparatus 201 in Embodiment 1 can obtain the amount of the consumed material solution 15 from the change in weight of the measurement target and responsively and accurately obtain the amount of the supplied material solution mist MT based on the amount of the consumed material solution 15 during performance of the ultrasonic vibration operation of the plurality of ultrasonic transducers 2.

In addition, the pipe overlapping space SP14 is formed between the connection pipe portion 43 as the overlapping pipe portion and the upper region Alt of the mist output pipe 1*t*, and the sealing proper liquid 16 is present in the region below the pipe overlapping space SP14.

The region below the pipe overlapping space SP14 is thus the space closed by the sealing proper liquid 16. That is to say, the flow path of the material solution mist MT in the pipe overlapping space SP14 is sealed by the sealing proper liquid 16.

The ultrasonic atomization apparatus 201 in Embodiment 1 can thus effectively suppress a mist leak phenomenon of leak of the material solution mist MT to the outside of the non-contact mist supply pipe 40 via the pipe overlapping space SP14.

Furthermore, the ultrasonic atomization apparatus 201 in Embodiment 1 uses the sealing proper liquid 16 having a higher specific gravity and a higher viscosity than water as the sealing liquid to enhance an effect of suppressing the above-mentioned mist leak phenomenon.

In addition, the ultrasonic atomization apparatus 201 in Embodiment 1 uses a double-chamber scheme including the water tank 10 as the transmission medium tank and the material solution container (the atomization container 1+the separator cup 12), and the measurement target of the scale 50 further includes the separator cup 12, the water tank 10, and the ultrasonic transmission water 9 (ultrasonic transmission medium). The ultrasonic atomization apparatus 201 using the double-chamber scheme can thus responsively and accurately obtain the amount of the supplied material solution mist MT.

Embodiment 2

Figure 3:
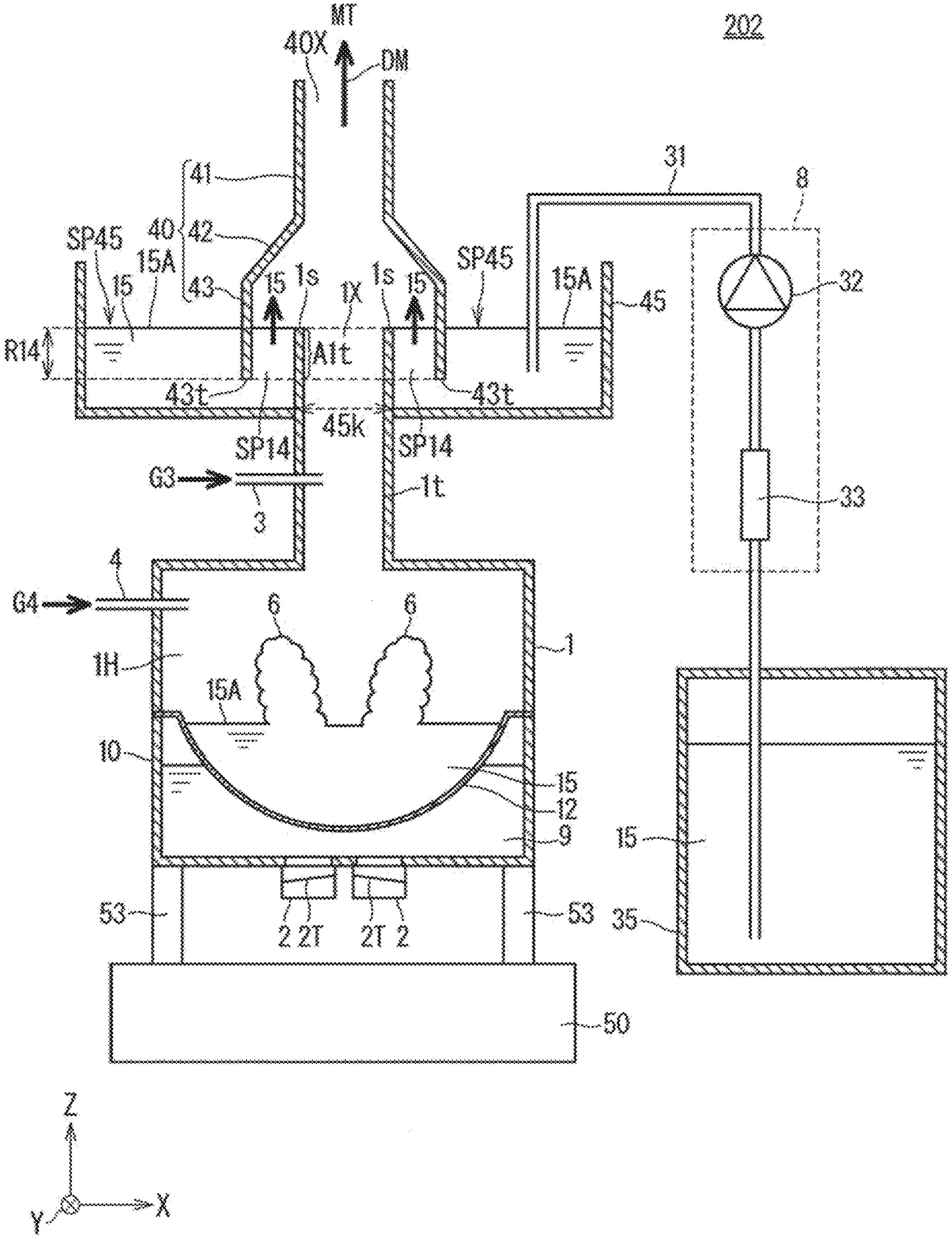
FIG. 3 is an illustration schematically showing a configuration of an ultrasonic atomization apparatus in Embodiment 2 of the present disclosure.

FIG. 3 is an illustration schematically showing a configuration of an ultrasonic atomization apparatus 202 in Embodiment 2 of the present disclosure. The XYZ Cartesian coordinate system is shown in FIG. 3. The configuration of the ultrasonic atomization apparatus 202 in Embodiment 2 will be described below with reference to FIG. 3. A portion similar to that of the ultrasonic atomization apparatus 201 in Embodiment 1 illustrated in FIG. 1 bear the same reference sign as that of the similar portion, and description thereof is omitted as appropriate.

In the ultrasonic atomization apparatus 202 in Embodiment 2, the material solution 15 is contained in the liquid containing space SP45 as the sealing liquid.

As with the sealing proper liquid 16 in Embodiment 1, the material solution 15 is also present in the pipe overlapping space SP14. The pipe overlapping space SP14 is thus a space closed by the material solution 15.

In the ultrasonic atomization apparatus 202 in Embodiment 2, the material solution 15 is contained in a limited capacity state in which the liquid containing space SP45 of the leakproof tank 45 is full of the material solution 15. Specifically, the leakproof tank 45 contains the material solution 15 in the liquid containing space SP45 so that a liquid level 15A of the material solution 15 matches the uppermost end 1*s* of the mist output pipe 1*t*.

The material solution 15 is thus contained in the liquid containing space SP45 in the limited capacity state in which the material solution 15 reaches the uppermost end 1*s* of the mist output pipe 1*t* in the pipe overlapping space SP14.

A path from the pipe overlapping space SP14 to the internal space 1H of the material solution container via the mist output pipe 1*t* is herein defined as a liquid flow path.

As the material solution 15, a first material solution and a second material solution described below are considered. The first material solution is a material solution obtained by dissolving many solutes in water (a solvent). The first material solution has a higher viscosity and a higher specific gravity than water.

The second material solution is a material solution obtained by dissolving a solute in an organic solvent, such as methanol, as a solvent. The second material solution has a lower viscosity and a lower specific gravity than water.

As the solute for each of the first material solution and the second material solution, a metal complex (e.g., zinc acetate and aluminum acetate) is considered, for example. The amount of the solute used for the second material solution, however, is set to an amount in a range in which the second material solution has a lower viscosity and a lower specific gravity than water.

The ultrasonic atomization apparatus 202 in Embodiment 2 includes a supply system for the material solution 15 including the material solution supply mechanism 8, the material solution supply pipe 31, and the material tank 35 as in Embodiment 1. In the ultrasonic atomization apparatus 202 in Embodiment 2, however, the material solution supply pipe 31 is provided not to the material solution container but to the leakproof tank 45 in contrast to Embodiment 1. Description will be made in this respect below.

The material tank 35 is provided independently of the material solution container and the leakproof tank 45. The material tank 35 contains therein the material solution 15 to be supplied to the material solution container via the leakproof tank 45. A material solution supply pipe 31 is provided between the leakproof tank 45 and the material tank 35. The material solution 15 can be supplied from the material tank 35 to the leakproof tank 45 via the material solution supply pipe 31.

The material solution supply mechanism 8 including the suction pump 32 and the flowmeter 33 is provided along the material solution supply pipe 31.

Figure 4:
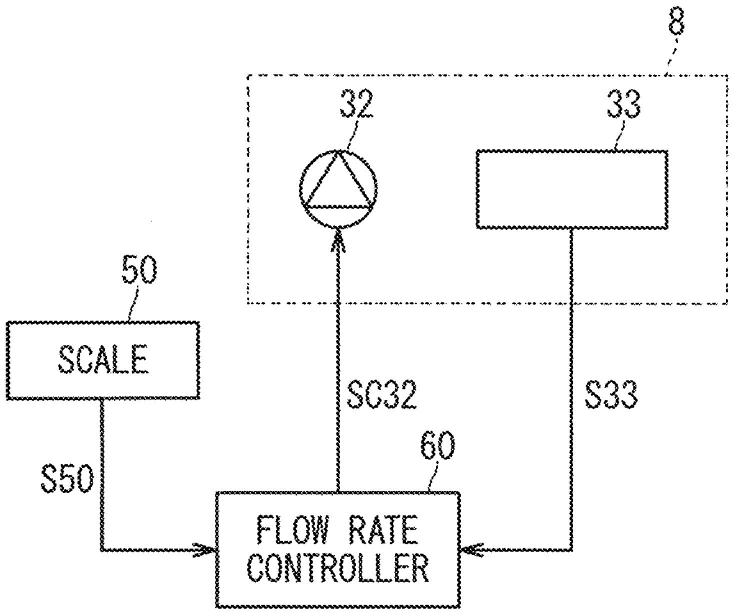
FIG. 4 is an illustration schematically showing a configuration of a flow rate control system for a material solution in the ultrasonic atomization apparatus in Embodiment 2.

FIG. 4 is an illustration schematically showing a configuration of a flow rate control system for the material solution 15 in the ultrasonic atomization apparatus 202 in Embodiment 2. As illustrated in FIG. 4, the flow rate control system includes the scale 50, the material solution supply mechanism 8, and a flow rate controller 60 as main components. The material solution supply mechanism 8 includes the suction pump 32 and the flowmeter 33.

The flowmeter 33 measures a flow rate through the material solution supply pipe 31 to obtain flow rate information S33 indicating the measured flow rate. The scale 50 measures the weight of the measurement target and outputs measured weight information S50 indicating the weight.

The flow rate controller 60 receives the flow rate information S33 from the flowmeter 33 and receives the measured weight information S50 from the scale 50. The flow rate controller 60 thus always recognizes the flow rate through the material solution supply pipe 31 by the measured flow rate indicated by the flow rate information S33.

The flow rate controller 60 can always obtain the amount of the material solution 15 consumed in the material solution container from the change in measured weight indicated by the measured weight information S50. In a case where the material solution 15 is supplied from the material tank 35 to the leakproof tank 45, the flow rate controller 60 can obtain the amount of the supplied material solution 15 from the measured flow rate indicated by the flow rate information S33 and can accurately obtain the amount of the consumed material solution 15 by taking the amount of the supplied material solution 15 into account.

The flow rate controller 60 can thus perform material supply control processing of outputting a control signal SC32 indicative of the amount of drive of the suction pump 32 to compensate for the amount of the material solution 15 consumed in the internal space 1H based on the flow rate information S33 and the measured weight information S50.

As described above, the flow rate controller 60 performs the material supply control processing of controlling material solution supply operation to supply the material solution 15 to leakproof tank 45 with respect to the material solution supply mechanism 8 including the suction pump 32 and the flowmeter 33.

When the material solution supply mechanism 8 performs the material solution supply operation, the material solution 15 is supplied to the leakproof tank 45. The amount of the material solution 15 supplied by the material solution supply operation is herein referred to as a supplied material solution amount SL45.

As described above, the leakproof tank 45 contains the material solution 15 in the liquid containing space SP45 in the limited capacity state. Thus, when the material solution 15 is supplied to the leakproof tank 45 by the material solution supply operation, the same amount of the material solution 15 as the supplied material solution amount SL45 is supplied into the internal space 1H of the material solution container via the above-mentioned liquid flow path.

Specifically, the material solution 15 in the supplied material solution amount SL45 overflows from the liquid containing space SP45, flows along an inner wall of the mist output pipe 1*t*, and then falls from the mist output pipe 1*t* to be supplied into the internal space 1H.

The ultrasonic atomization apparatus 201 in Embodiment 1 performs the material supply control processing of controlling the material solution supply operation to directly supply the material solution 15 to the material solution container with respect to the material solution supply mechanism 8 under control performed by the flow rate controller 60 as in Embodiment 2.

As described above, the ultrasonic atomization apparatus 202 in Embodiment 2 accurately recognizes the amount of the material solution 15 consumed in the material solution container based on the measured weight information S50 obtained by the scale 50 and the flow rate information S33 obtained by the flowmeter 33. The ultrasonic atomization apparatus 202 obtains the amount of the supplied material solution mist MT from the amount of the consumed material solution 15.

The non-contact mist supply pipe 40 of the ultrasonic atomization apparatus 202 in Embodiment 2 does not have the contacting relationship with the atomization container 1 including the mist output pipe 1*t* and the leakproof tank 45 and thus can relatively easily be excluded from the measurement target of the scale 50 as the weight measuring instrument.

On the other hand, the material solution 15 in the material solution container is included in the measurement target of the scale 50 as the weight measuring instrument, and the weight of the measurement target excluding the material solution 15 has a constant value.

As a result, the ultrasonic atomization apparatus 202 in Embodiment 2 can obtain the amount of the consumed material solution 15 from the change in weight of the measurement target and responsively and accurately obtain the amount of the supplied material solution mist MT based on the amount of the consumed material solution 15 during performance of the ultrasonic vibration operation as in Embodiment 1.

Assume herein that the material solution 15 is supplied from the material tank 35 into the internal space 1H of the material solution container via the leakproof tank 45 by the material solution supply operation performed by the material solution supply mechanism 8.

In this case, the flow rate controller 60 can obtain the amount of the material solution 15 supplied from the material tank 35 to the leakproof tank 45 based on the flow rate information S33 received from the flowmeter 33 of the material solution supply mechanism 8 and properly exclude the amount of the supplied material solution 15 from the change in weight of the measurement target.

Furthermore, in a case where the ultrasonic atomization apparatus 202 in Embodiment 2 uses the above-mentioned first material solution having a higher specific gravity and a higher viscosity than water as the sealing liquid, the effect of suppressing the above-mentioned mist leak phenomenon can be enhanced as in Embodiment 1.

In addition, in the ultrasonic atomization apparatus 202 in Embodiment 2, the material solution 15 is present in the pipe overlapping space SP14 as the sealing liquid.

The flow path of the material solution mist MT in the pipe overlapping space SP14 is thus sealed by the material solution 15. The ultrasonic atomization apparatus 202 in Embodiment 2 can thus suppress the mist leak phenomenon of leak to the outside of the non-contact mist supply pipe 40 via the pipe overlapping space SP14.

In addition, the leakproof tank 45 contains the material solution 15 in the above-mentioned limited capacity state so that the material solution 15 can be supplied to the material solution container via the above-mentioned liquid flow path, and thus the material solution 15 can be supplied into the internal space 1H of the material solution container via the above-mentioned liquid flow path.

The ultrasonic atomization apparatus 202 in Embodiment 2 can thus maintain a current of the material solution mist MT generated in the internal space 1H constant as it is not necessary to provide the material solution supply pipe 31 in the internal space 1H as in the ultrasonic atomization apparatus 201 in Embodiment 1.

The supply of the material solution 15 from the leakproof tank 45 via the above-mentioned liquid flow path does not adversely affect output of the material solution mist MT along the mist output direction DM in the mist output pipe 1*t* as it is along the inner wall of the mist output pipe 1*t*.

The ultrasonic atomization apparatus 202 in Embodiment 2 includes the material tank 35 independently of the material solution container and the leakproof tank 45, and the material solution 15 is supplied from the material tank 35 into the internal space 1H of the material solution container via the leakproof tank 45. In this case, the leakproof tank 45 contains the material solution 15 in the limited capacity state in which the liquid level 15A of the material solution 15 is the same as the level of the uppermost end 1*s* of the mist output pipe 1*t*.

In the ultrasonic atomization apparatus 202 in Embodiment 2, the same amount of the material solution 15 as the supplied material solution amount SL45 from the material solution supply mechanism 8 to the leakproof tank 45 is supplied to the internal space 1H of the material solution container via the above-mentioned liquid flow path.

Herein, a material solution 15α is the material solution 15 in the material tank 35, a material solution 15β is the material solution 15 in the liquid containing space SP45 of the leakproof tank 45, and a material solution 15γ is the material solution 15 in the internal space 1H of the material solution container.

When the material solution 15α is supplied from the material solution supply mechanism 8 into the liquid containing space SP45 of the leakproof tank 45, the same amount of the material solution 15β as the amount of the supplied material solution 15α is supplied into the internal space 1H of the material solution container via the above-mentioned liquid flow path without delay. As a result, the same amount of the material solution 15β as the amount of the supplied material solution 15α is supplied to the material solution 15γ in the internal space 1H of the material solution container.

The ultrasonic atomization apparatus 202 in Embodiment 2 can thus supply the material solution 15 from the material tank 35 into the internal space 1H of the material solution container via the above-mentioned liquid flow path with accuracy by causing the material solution supply mechanism 8 to perform the material solution supply operation under control performed by the flow rate controller 60.

That is to say, the material solution 15 is indirectly supplied from the material tank 35 into the internal space 1H of the material solution container under control performed by the flow rate controller 60.

Furthermore, the ultrasonic atomization apparatus 202 in Embodiment 2 using the double-chamber scheme can responsively and accurately obtain the amount of the supplied material solution mist MT as in Embodiment 1.

While the present disclosure has been described in detail, the foregoing description is in all aspects illustrative and not restrictive. It is understood that numerous unillustrated modifications can be devised without departing from the scope of the present disclosure.

The invention claimed is:

1. An ultrasonic atomization apparatus comprising:

a material solution container that has an internal space for containing a material solution and includes a mist output pipe at a top surface thereof;

an ultrasonic transducer that is provided below the material solution container;

a non-contact mist supply pipe that is provided above the material solution container including the mist output pipe without being in contact with the material solution container;

a leakproof tank that is provided to be connected to the mist output pipe without being in contact with the non-contact mist supply pipe; and a weight measuring instrument that supports the material solution container from below and measures the weight of a measurement target including the material solution container, the ultrasonic transducer, the leakproof tank, and the material solution, wherein the material solution is misted by ultrasonic vibration operation of the ultrasonic transducer to generate material solution mist in the internal space, the non-contact mist supply pipe includes an overlapping pipe portion and a non-overlapping pipe portion other than the overlapping pipe portion, the overlapping pipe portion having a pipe overlapping region in which the overlapping pipe portion and an upper region of the mist output pipe overlap along a mist output direction, a pipe overlapping space being formed between the overlapping pipe portion and the upper region, a liquid containing space is formed between the leakproof tank and the mist output pipe, the liquid containing space containing a sealing liquid therein, the sealing liquid being present in the pipe overlapping space, the measurement target further including the sealing liquid, and the material solution mist flows in the mist output pipe and the non-contact mist supply pipe along the mist output direction and is output from the non-contact mist supply pipe.

2. The ultrasonic atomization apparatus according to claim 1, wherein the sealing liquid is a sealing proper liquid having a higher specific gravity and a higher viscosity than water.

3. The ultrasonic atomization apparatus according to claim 1, wherein the sealing liquid is the material solution, and a path from the pipe overlapping space to the internal space via the mist output pipe is defined as a liquid flow path of the material solution, and the leakproof tank contains the material solution in the liquid containing space so that the material solution is suppliable to the material solution container via the liquid flow path.

4. The ultrasonic atomization apparatus according to claim 3, wherein a liquid level of the material solution in the pipe overlapping space is set to match an uppermost end of the mist output pipe, the ultrasonic atomization apparatus further comprises:

a material tank that is provided independently of the material solution container and the leakproof tank, the material tank being for containing the material solution; and a material solution supply mechanism that performs material solution supply operation to supply the material solution contained in the material tank into the leakproof tank, and the same amount of the material solution in the leakproof tank as the amount of the material solution supplied to the leakproof tank by the material solution supply operation is supplied to the internal space of the material solution container via the liquid flow path.

5. The ultrasonic atomization apparatus according to claim 1, wherein the material solution container includes a separator cup at a bottom surface thereof, the ultrasonic atomization apparatus further comprises a transmission medium tank for containing an ultrasonic transmission medium therein, the transmission medium tank and the separator cup being positioned so that a bottom surface of the separator cup is submerged in the ultrasonic transmission medium, the ultrasonic transducer is provided at a bottom surface of the transmission medium tank located below the separator cup, the weight measuring instrument supports the transmission medium tank from the bottom surface of the transmission medium tank without being in contact with the ultrasonic transducer, and the measurement target further includes the separator cup, the transmission medium tank, and the ultrasonic transmission medium.

* * * * *